United States Patent [19]
Sunaga et al.

[11] Patent Number: 5,968,171
[45] Date of Patent: Oct. 19, 1999

[54] INITIALIZATION PROCESSING SYSTEM OF IN-CAR MICROCOMPUTER

[75] Inventors: Hideki Sunaga; Masatoshi Suto, both of Tokyo, Japan

[73] Assignee: Calsonic Corporation, Tokyo, Japan

[21] Appl. No.: 08/962,058

[22] Filed: Oct. 31, 1997

[30] Foreign Application Priority Data

Nov. 1, 1996 [JP] Japan .................................. 8-290977

[51] Int. Cl.$^6$ ................................................ G06F 9/06
[52] U.S. Cl. .................................. 713/1; 713/202
[58] Field of Search .................. 395/651, 652, 395/188.01; 701/36; 340/449; 713/1, 2, 202

[56] References Cited

U.S. PATENT DOCUMENTS

| | | | |
|---|---|---|---|
| 4,274,265 | 6/1981 | Okumura | 62/158 |
| 4,419,730 | 12/1983 | Ito et al. | 364/424 |
| 4,510,764 | 4/1985 | Suzuki | 62/133 |
| 5,291,479 | 3/1994 | Vaziri et al. | 370/58.2 |
| 5,517,101 | 5/1996 | Sakai et al. | 318/685 |
| 5,530,885 | 6/1996 | Kagohata | 395/800 |
| 5,652,886 | 7/1997 | Tulpule et al. | 395/652 |
| 5,664,198 | 9/1997 | Chen et al. | 395/733 |
| 5,718,120 | 2/1998 | Sakurai | 62/126 |
| 5,734,900 | 3/1998 | Kaiser et al. | 395/652 |

*Primary Examiner*—Joseph E. Palys
*Assistant Examiner*—Omar A. Omar
*Attorney, Agent, or Firm*—Sughrue, Mion, Zinn, Macpeak & Seas, PLLC

[57] ABSTRACT

An external interrupt port is installed for writing a password into a random access memory by monitoring low voltage with an interrupt when a battery is turned off and on instantaneously and performing ignition off processing. During Random access memory initialization the system disables an external interrupt and initializes output of ports containing the external interrupt port when an ignition switch is turned on, next makes a password check just after initializing output of the ports, then enables an external interrupt and executes initialization.

2 Claims, 6 Drawing Sheets

INITIALIZATION PROCESSING SYSTEM OF IN-CAR MICROCOMPUTER

BACKGROUND OF THE INVENTION

1. Field of the Invention

This invention relates to an initialization processing system of an in-car microcomputer of an air conditioning amplifier unit, etc., for controlling a vehicle air conditioning system.

2. Description of the Related Art

A conventionally known initialization processing system of a random access memory (RAM) of an air conditioning amplifier unit having a battery backup memory for controlling a vehicle air conditioning system writes a password into the RAM of the air conditioning amplifier unit when an ignition switch is turned off and makes a password check to see if the password read when the ignition key was turned on matches the written password. If both the passwords match, the processing system does not clear the backup memory; if the passwords do not match, the processing system clears the backup memory and initializes the RAM at the battery off to on time.

Thus, the read password (no password because of battery off) does not match the written password at the first time when the ignition key is turned on after battery replacement, so that the RAM is initialized at the battery off to on time.

However, the conventional initialization processing system of an air conditioning amplifier unit does not write a password at the instantaneous battery off and on time, thus clears the backup memory although the battery is not just after replacement (causes so-called lost memory).

In contrast, a proposal is made for providing an external interrupt port, monitoring low voltage in interrupt service before a password check, and performing ignition off processing, thereby writing a password into RAM regardless of the instantaneous battery off and on time.

However, in the conventional initialization technique, if noise is entered in the external interrupt port at the wiring connection time, etc., because of battery replacement and signals similar to those for instantaneously turning on and off the ignition key are input due to the noise, an external interrupt is enabled by the on signal and a password is written by external interrupt service of the off signal. Thus, when the ignition key is first turned on after battery replacement, password OK is returned from a password check and initial values are not set at the battery off to on time, resulting in a so-called abnormal memory state in which the backup memory remains cleared, causing the later control to become abnormal.

SUMMARY OF THE INVENTION

It is therefore an object of the invention to prevent lost memory caused by instantaneously turning off and on a battery and also prevent an abnormal memory state if noise is entered in an external interrupt port at the battery replacement in an initialization processing system of an in-car microcomputer having a battery backup memory.

Figure 1:
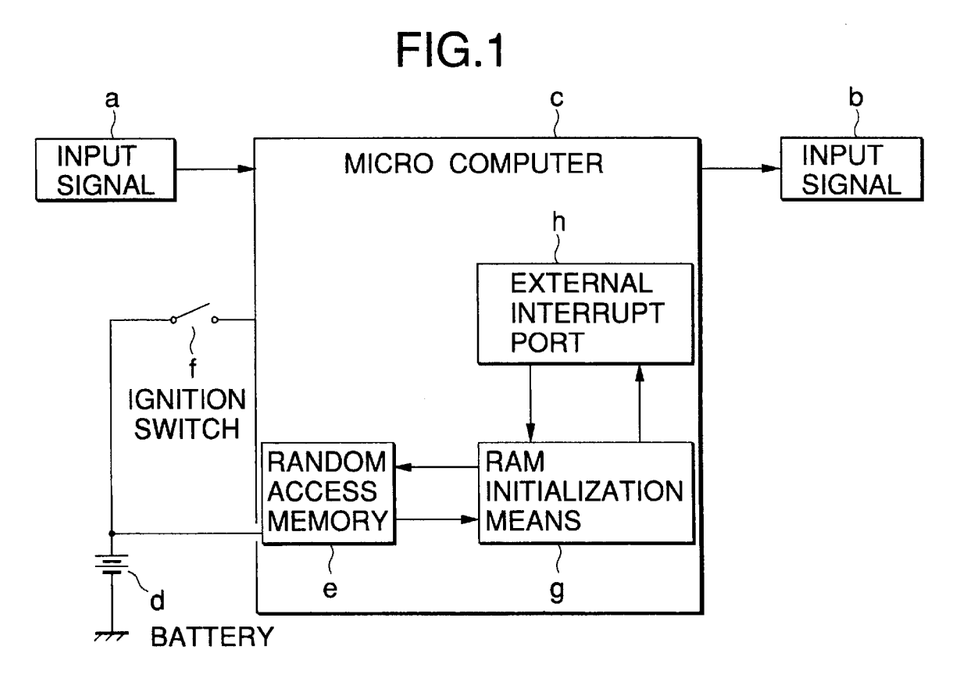
FIG. 1 is a general diagram of an initialization processing system of an in-car microcomputer of an embodiment of the invention.

According to the invention, as shown in FIG. 1, there is provided an initialization processing system of an in-car microcomputer comprising: a microcomputer c being installed in a vehicle for performing operations on input signals a following program software and outputting a drive command to an actuator b; a random access memory e being placed in the microcomputer c and having a battery d as a backup power supply; and random access memory initialization means g for writing a password into the random access memory e when an ignition switch f is off, reading a password when the ignition switch f is on, making a password check to see if the read password is the same as the written password, and leaving a backup memory intact if both the passwords are the same or clearing the backup memory and executing random access memory initialization at the battery d off to on time if both the passwords are not the same; an external interrupt port h for writing a password into the random access memory e by monitoring low voltage with an interrupt when the battery d is turned off and on instantaneously and performing ignition off processing; wherein the random access memory initialization means g first disables an external interrupt and initializes output of ports containing the external interrupt port h when the ignition switch f is turned on, next makes a password check just after initializing output of the ports, then enables an external interrupt and executes initialization.

In the above initialization processing system, the microcomputer c is contained in an air conditioning amplifier unit for performing operations on input signals from a controller having an operation section provided with switches such as a mode switch and a temperature control dial and sensors such as inside-air and outside-air temperature sensors following program software and driving a fan motor and door actuators installed in an air conditioning system.

BRIEF DESCRIPTION OF THE DRAWINGS

In the accompanying drawings:

FIG. 4 is a flowchart to show a flow of initialization processing performed by the air conditioning amplifier unit of the embodiment of the invention when ignition is turned on;

FIG. 5 is a flowchart to show a flow of initialization processing performed by the air conditioning amplifier unit of the embodiment of the invention when ignition is turned on;

DETAILED DESCRIPTION OF THE PREFERRED EMBODIMENTS

First, the configuration of one embodiment of the initialization processing system according to the present invention will be discussed.

Figure 2:
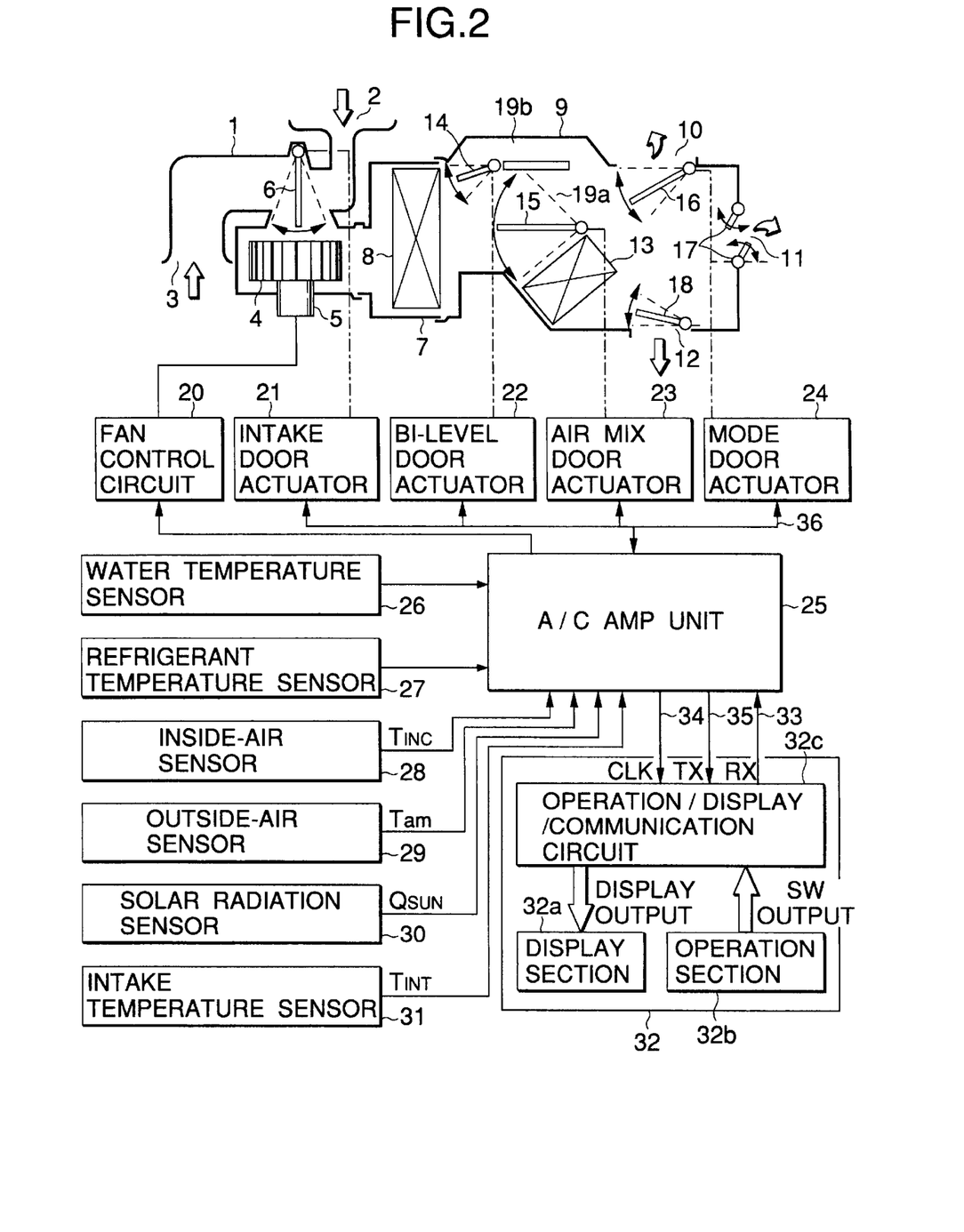
FIG. 2 is a general diagram of a vehicle air conditioning system to which the initialization processing system of an in-car microcomputer of an embodiment of the invention is applied.

FIG. 2 is a diagram of a vehicle air conditioning system to which the initialization processing system of an in-car microcomputer of the first embodiment is applied.

The mechanism of the air conditioning system comprises an intake unit case 1, an outside-air admission port 2, an indoor admission port 3, a blower fan 4, a blower fan motor 5, an intake door 6, a cleaning unit case 7, an evaporator 8, a heater unit case 9, a vent air outlet 10, a deaf air outlet 11, a foot air outlet 12, a heater core 13, a bi-level door 14, an air mix door 15, a vent door 16, a deaf door 17, and a foot door 18, as shown in the upper portion of FIG. 2.

A control system of the air conditioning system comprises a fan control circuit 20, an intake door actuator 21, a bi-level door actuator 22, an air mix door actuator 23, a mode door actuator 24, an air conditioning amplifier unit 25, a water temperature sensor 26, a refrigerant temperature sensor 27, an inside-air sensor 28, an outside-air sensor 29, a solar radiation sensor 30, an intake temperature sensor 31, and a controller 32, as shown in the middle portion to lower portion of FIG. 2.

The fan control circuit 20 controls an application voltage to the blower fan motor 5 continuously in response to a command from the air conditioning amplifier unit 25.

When the air conditioning amplifier unit 25 determines the door opening of the intake door 6 (inside air, semioutside air, or outside air), the intake door actuator 21 moves the intake door 6 to the determined door opening.

If the opening of the air mix door 15 is fully cold in a vent mode or in a bi-level mode for keeping user's head cool and user's feet warm, the bi-level door actuator 22 fully opens the bi-level door 14 (placed on a passage 19b) disposed in parallel with the air mix door 15 (placed on a passage 19a).

When the air conditioning amplifier unit 25 determines assumed door opening XPBR, the air mix door actuator 23 receives the data of the assumed door opening XPBR and operates the mix door 15 so as to provide the door opening matching the assumed door opening XPBR.

When the air conditioning amplifier unit 25 determines a target mode door position, the mode door actuator 24 opens or closes the mode door (generic name for the vent door 16, the deaf door 17, and the foot door 18).

The air conditioning amplifier unit 25 performs operations on input signals from switches and the sensors by an internal microcomputer following program software and controls the blower fan motor 5, the door actuators 21 to 24, a compressor (not shown), etc.

The water temperature sensor 26 detects engine cooling water temperature, the refrigerant temperature sensor 27 detects refrigerant temperature, the inside-air sensor 28 detects inside-air temperature TINC, the outside-air sensor 29 detects outside-air temperature Tam, the solar radiation sensor 30 detects solar radiation amount QSUN, and the intake temperature sensor 31 detects intake temperature TINT. Then, the sensors input the detection results to the air conditioning amplifier unit 25.

The controller 32 is installed in a control panel in a cabin and is made up of a display section 32a for displaying the mode, fan speed, temperature, etc., an operation section 32b provided with a mode switch, a temperature control dial, etc., and an operation/display/communication circuit 32c for performing display output to the display section 32a, switch input from the operation section 32b, and data communication with the air conditioning amplifier unit 25. The operation/display/communication circuit 32c and the air conditioning amplifier unit 25 are connected by an operation data line 33, a clock signal line 24, and a display communication data line 35.

Figure 3:
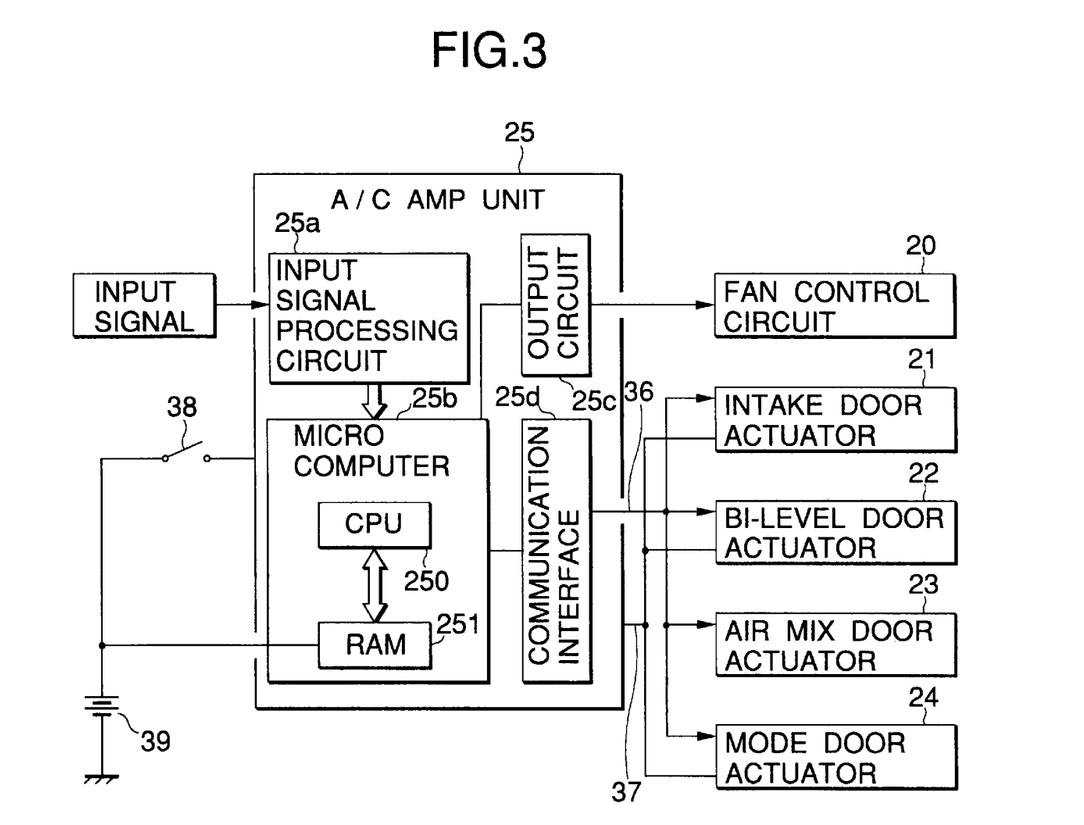
FIG. 3 is a block diagram to show a control system centering on an air conditioning amplifier unit of the embodiment of the invention.

FIG. 3 is a block diagram to show the control system centering on the air conditioning amplifier unit 25.

The air conditioning amplifier unit 25 and the door actuators 21 to 24 are connected by a communication line 36 and a power supply line 37. The air conditioning amplifier unit 25 transmits the address of the door actuator 21, 22, 23, or 24 and target position data of a motor and the actuator having the corresponding address receives the data and turns the motor to the target position.

The air conditioning amplifier unit 25 starts initialization processing of initial values in the RAM, etc., when an ignition switch 38 is turned on, and performs door control, etc., after the initialization processing. The air conditioning amplifier unit 25 comprises an input signal processing circuit 25a for converting input signals into signals appropriate for operations, a microcomputer 25b for performing operations on the input signals from the input signal processing circuit 25a following program software, and an output circuit 25c and a communication interface 25d for receiving commands from the microcomputer 25b. The microcomputer 25b has a CPU (central processing unit) 250 and a RAM (random access memory) 251 with a battery 39 as a backup power supply.

Next, the operation will be discussed.

[Initialization Processing]

Figure 4:
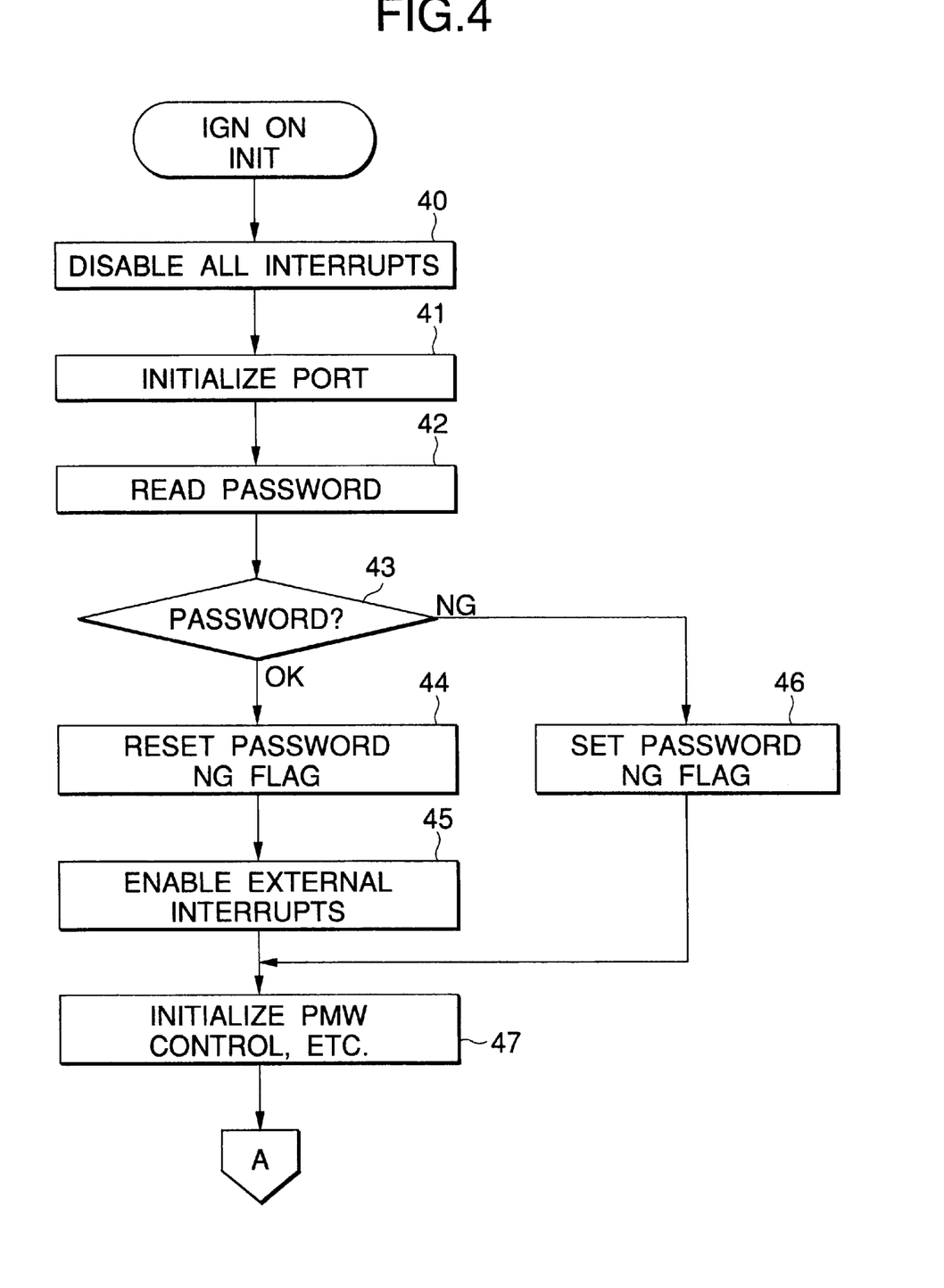
Figure 5:
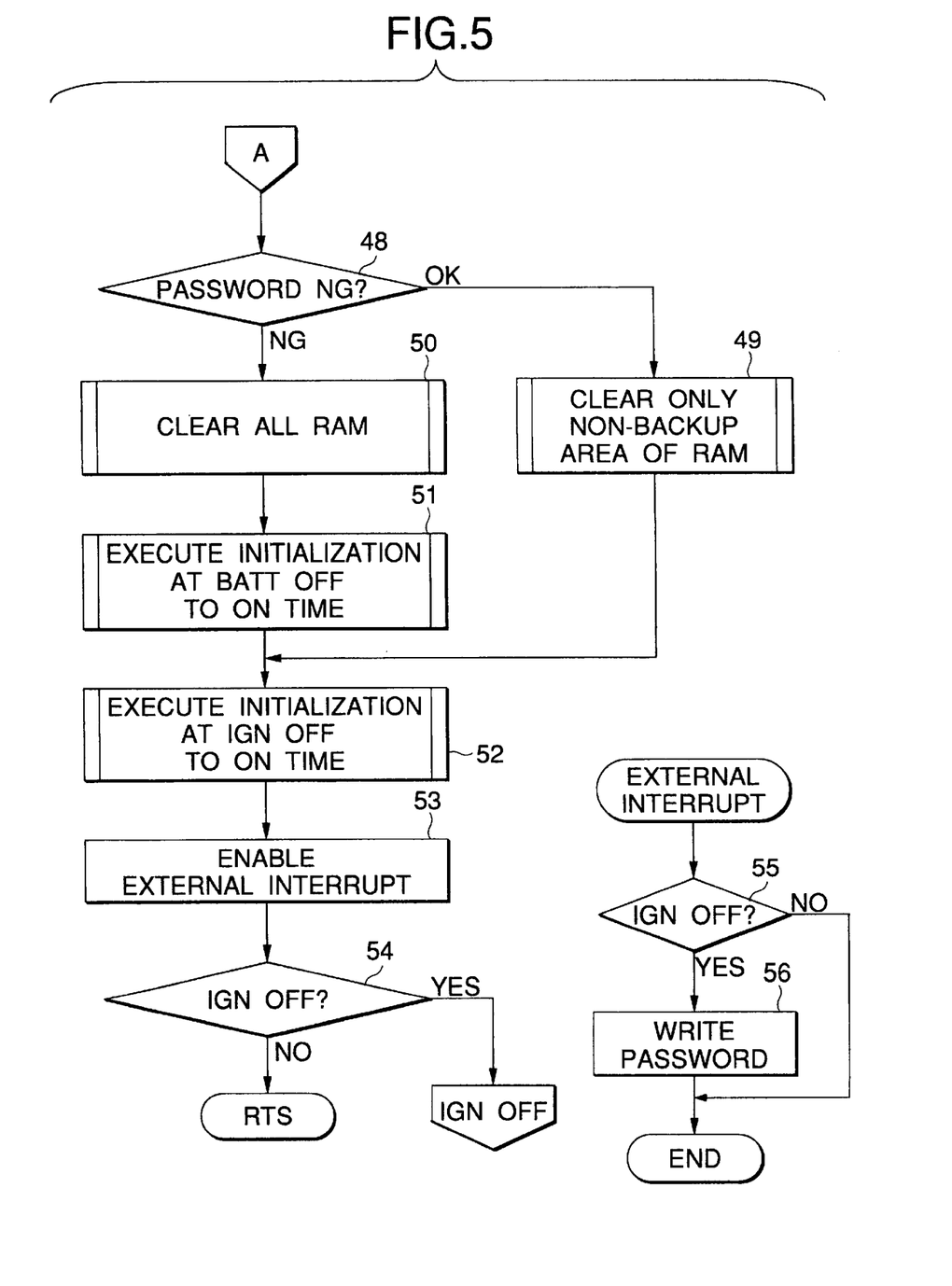

FIGS. 4 and 5 are flowcharts to show a flow of initialization processing performed by the air conditioning amplifier unit 25 when the ignition is turned on. The steps will be discussed.

At step 40, when the ignition switch 38 is turned on, immediately all interrupts are disabled.

At step 41, ports are initialized.

At step 42, a password written in the RAM 251 is read.

At step 43, a password check is made to see if the read password matches written password.

If both the passwords match in the password check at step 43, a password NG flag is reset at step 44.

External interrupts disabled at step 40 are enabled at step 45.

If both the passwords do not match in the password check at step 43, the password NG flag is set at step 46.

At step 47, serial communication, PWM control, and the like are initialized regardless of the result of the password check at step 43.

At step 48, whether the password NG flag is set or reset is determined.

If it is determined at step 48 that the password NG flag is reset (OK), memory information written only in the non-backup area of the RAM 251 is cleared at step 49.

If it is determined at step 48 that the password NG flag is set (NG), memory information written in the backup area and the non-backup area of the RAM 251 is cleared at step 50.

If all the RAM is cleared at step 50, initialization of the RAM 251 at the battery 39 off to on time is executed at step 51.

At step 52, initialization of the RAM 251 at the ignition switch 38 off to on time is executed regardless of whether the password check is NG or OK.

External interrupts are enabled at step 53.

Whether or not the ignition switch 38 is off is determined at step 54.

When external interrupts are enabled, whether or not the ignition switch 38 is off (also containing a case where ignition off processing is performed by monitoring low voltage at the external interrupt port) is determined at step 55.

If it is determined at step 54 that the ignition switch 38 is off, password is written at step 56.

When the ignition is on, after the initialization processing is performed, the control routine is entered and control of door control, etc., is performed.

[RAM Initialization Processing]

Figure 6:
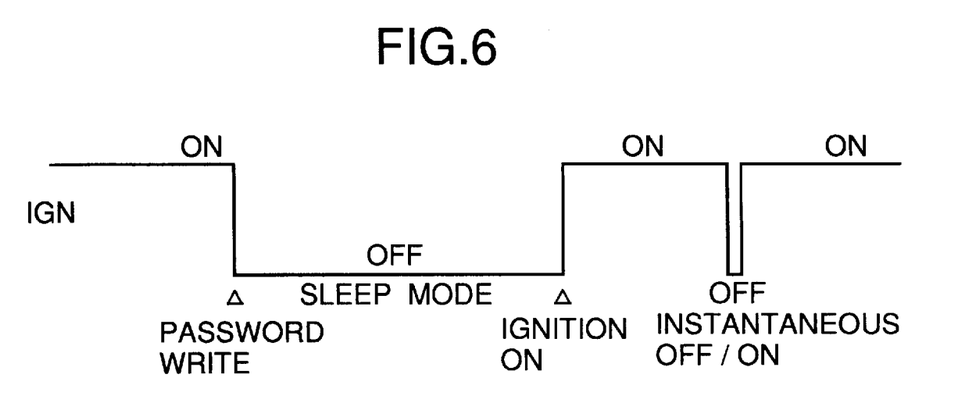
FIG. 6 is a time chart to show RAM initialization processing when a battery is mounted in the embodiment of the invention.

At the normal time with battery mounted:

If the ignition switch 38 is turned off from on, as shown in FIG. 6, at the normal time with a battery mounted, a password is written into the RAM 251 and a sleep mode is entered. Control goes to step 56 from step 55 in FIG. 5 based on external interrupt enable, whereby the password is written into the RAM 251.

If the ignition switch 38 is again turned on, control goes to step 40 to step 41 to step 42 to step 43 to step 44 to step 45 to step 47 to step 48 to step 49 to step 52 in the RAM initialization processing shown in FIGS. 4 and 5. A password is read and whether or not the password is the same as the previous password is checked. Initialization of the RAM 251 at the ignition switch 38 off to on time is executed based on the determination of password OK.

When battery is turned off and on instantaneously:

If the battery 38 is turned off and on instantaneously, when low voltage is detected by monitoring low voltage with the external interrupt port at the battery off time, ignition off processing as the ignition switch 38 is turned off is performed, and control goes to step 55 to step 56 in FIG. 5 based on external interrupt enable, whereby a password is written into the RAM 251. When the battery is turned on, a password check is made according to the RAM initialization processing flow shown in FIGS. 4 and 5. In this case, the time in writing the password is provided, thus the read password matches the written password, so that the backup memory is not cleared.

Therefore, clearing the backup memory when the battery 38 is turned off and on instantaneously, namely, so-called lost memory is prevented.

Figure 7:
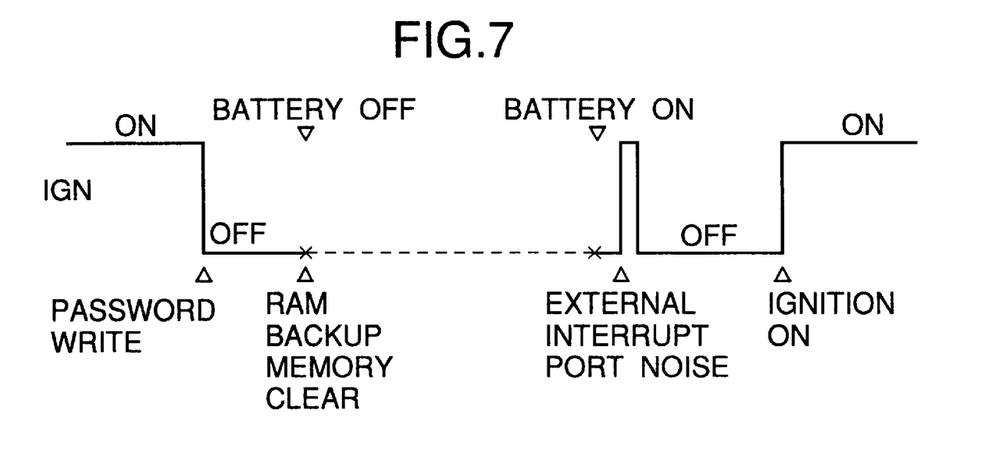
FIG. 7 is a time chart to show RAM initialization processing when a battery is demounted in the embodiment of the invention.

When battery is demounted:

When the battery 39 is demounted, the battery backup memory of the RAM 251 is cleared as shown in FIG. 7. If noise is entered in the external interrupt port at the wiring connection time, etc., as the battery 39 is replaced and signals similar to those for instantaneously turning on and off the ignition switch 38 are input, immediately all interrupts are disabled at step 40 and the ports are initialized at step 41 so that abnormal operation does not occur. If the on signal is input due to noise, external interrupt service is not executed. If the off signal is input due to noise just after the on signal, no password is written.

This prevents occurrence of so-called abnormal memory state in which when the ignition key is first turned on after battery replacement, password OK is returned from the password check, initial values are not set at the battery off to on time, and the backup memory remains cleared.

Next, the effects will be discussed.

In the initialization processing system of the in-car microcomputer 25b having the battery-backup RAM251, the external interrupt port is installed for writing a password into the random access memory 251 by monitoring low voltage with an interrupt when the battery 39 is turned off and on instantaneously and performing ignition off processing. When the ignition switch 38 is turned on, first an external interrupt is disabled and output of the ports containing the external interrupt port is initialized, next a password check is made just after output of the ports is initialized, then an external interrupt is enabled and initialization is executed. Thus, lost memory caused by instantaneously turning off and on the battery can be prevented and an abnormal memory state can also be prevented if noise is entered in the external interrupt port at the battery replacement time. The microcomputer 25b is contained in the air conditioning amplifier unit 25 for performing operations on input signals from the controller 32 having the operation section 32b provided with the switches such as the mode switch and the temperature control dial and the sensors such as the inside-air and outside-air temperature sensors 28 and 29 following program software and driving the fan motor 5 and the door actuators 21 to 24 installed in the air conditioning system. Thus, lost memory when the battery is turned off and on instantaneously and the abnormal memory state at the battery replacement time are prevented, whereby the RAM 251 containing battery backup memory information can be prevented from becoming a memory error and normal air conditioning control can be provided for holding a cabin in a comfortable air conditioning state.

In the aforementioned embodiment, the microcomputer 25b is contained in the air conditioning amplifier unit 25 for performing air conditioning control. However, of course, the technique can be applied as an initialization processing system of a microcomputer of various control systems installed in a vehicle, such as engine control, automatic transmission control, drive force distribution control, braking control, suspension control, and auxiliary rudder angle control.

In the initialization processing system of the in-car microcomputer having the battery-backup memory, the external interrupt port is installed for providing the time in writing a password into the random access memory by monitoring low voltage with an interrupt when the battery is turned off and on instantaneously and performing ignition off processing. The random access memory initialization means first disables an external interrupt and initializes output of ports containing the external interrupt port when the ignition switch is turned on, next makes a password check just after initializing output of the ports, then enables an external interrupt and executes initialization. Thus, lost memory caused by instantaneously turning off and on the battery can be prevented and an abnormal memory state can also be prevented if noise is entered in the external interrupt port at the battery replacement time.

The microcomputer is contained in the air conditioning amplifier unit for performing operations on input signals from the controller having the operation section provided with the switches such as the mode switch and the temperature control dial and the sensors such as the inside-air and outside-air temperature sensors following program software and driving the fan motor and the door actuators installed in the air conditioning system. Thus, lost memory when the battery is turned off and on instantaneously and the abnormal memory state at the battery replacement time are prevented, whereby the RAM containing battery backup memory information can be prevented from becoming a memory error and normal air conditioning control can be provided for holding a cabin in a comfortable air conditioning state.

What is claimed is:

1. An initialization processing system of an in-car microcomputer comprising:

a microcomputer for performing operations on input signals and outputting a drive command to an actuator;

a random access memory associated with said microcomputer and having a battery as a backup power supply;

random access memory initialization means for writing a password into said random access memory when an ignition switch is turned off, reading a password from said random access memory when the ignition switch is turned on, making a password check to see if the read password is the same as the written password, and leaving a backup memory intact if both the passwords are the same or clearing the backup memory and executing random access memory initialization associated with switching the battery on if both the passwords are not the same; and an external interrupt port for writing a password into said random access memory, wherein said external interrupt port monitors low voltage and performs an interrupt when the battery is turned off and on instantaneously and performs processing associated with switching the ignition off;

wherein said random access memory initialization means disables an external interrupt and initializes output of said external interrupt port when the ignition switch is turned on, makes a password check just after initializing output of the ports, then enables an external interrupt and executes initialization.

2. The initialization processing system according to claim 1, wherein said microcomputer is contained in an air conditioning amplifier unit, wherein said microcomputer performs operations on input signals from a controller having an operation section provided with switches and sensors, wherein said switches include a mode switch and a temperature control dial and, wherein said sensors include inside-air and outside-air temperature sensors, wherein said microcomputer performs its function based on a program software and drives a fan motor and door actuators installed in the air conditioning system.

* * * * *